United States Patent
Koga et al.

(10) Patent No.: US 7,327,050 B2
(45) Date of Patent: Feb. 5, 2008

(54) ELECTRIC STEERING LOCK DEVICE AND METHOD THEREOF

(75) Inventors: Yoichi Koga, Ayase (JP); Tetsuya Asada, Hadano (JP)

(73) Assignee: Nissan Motor Co., Ltd., Yokohama (JP)

( * ) Notice: Subject to any disclaimer, the term of this patent is extended or adjusted under 35 U.S.C. 154(b) by 351 days.

(21) Appl. No.: 11/239,685

(22) Filed: Sep. 30, 2005

(65) Prior Publication Data

US 2006/0071556 A1 Apr. 6, 2006

(30) Foreign Application Priority Data

Oct. 5, 2004 (JP) ............... 2004-292392

(51) Int. Cl.
*B60R 25/02* (2006.01)
(52) U.S. Cl. ............... 307/10.2; 307/10.1; 307/10.6; 200/DIG. 39
(58) Field of Classification Search ............... 307/10.1, 307/10.2, 115, 116, 10.6; 701/34; 180/286; 200/61.54, DIG. 39; 340/426.3, 426.31; 70/252
See application file for complete search history.

(56) References Cited

U.S. PATENT DOCUMENTS 4,638,882 A 1/1987 Sato
7,145,264 B2* 12/2006 Nagae et al. ............... 307/10.2
7,151,324 B2* 12/2006 Neuhoff et al. ............ 307/10.2
2006/0028067 A1* 2/2006 Otani et al. ................ 307/10.1
2006/0076834 A1* 4/2006 Kamiya ..................... 307/10.1

FOREIGN PATENT DOCUMENTS

JP 2003-252174 A 9/2003

* cited by examiner

*Primary Examiner*—Michael Sherry
*Assistant Examiner*—Andrew Deschere
(74) *Attorney, Agent, or Firm*—Global IP Counselors, LLP

(57) ABSTRACT

An electric steering lock device is configured with a control unit to operate a steering column lock between a steering locked state and a steering unlocked state. The electric steering lock device has a locking limit switch that turns on when a locking member reaches the locking stop position, and turns off when an unlocking command for the locking member is outputted. An unlocking limit switch of the electric steering lock device turns on when the locking member reaches the unlocking stop position, and turns off when a locking command for the locking member is outputted. The electric steering lock control unit determines that the locking limit switch or the unlocking limit switch has malfunctioned based on the state of the locking member.

20 Claims, 5 Drawing Sheets

| POSITIONAL RELATIONSHIP BETWEEN LEVER AND GROOVE OF LOCKING ROD | LEVER NOT IN GROOVE OF LOCKING ROD | THE INSTANT THE LEVER ENTERS GROOVE OF LOCKING ROD | LEVER IN GROOVE OF LOCKING ROD | THE INSTANT THE LEVER LEAVES THE GROOVE OF LOCKING ROD | LEVER NOT IN GROOVE OF LOCKING ROD |
|---|---|---|---|---|---|
| LOCKED-STATE SWITCH | ON | ON → OFF | OFF | OFF → ON | ON |
| UNLOCKED-STATE SWITCH | OFF | OFF → ON | ON | ON → OFF | OFF |

Fig. 2

| STATE OF LOCKING ROD | LOCKED STATE | TRANSITION FROM LOCKED STATE TO UNLOCKED STATE | UNLOCKED STATE | TRANSITION FROM UNLOCKED STATE TO LOCKED STATE | LOCKED STATE |
|---|---|---|---|---|---|
| LOCKING LIMIT SWITCH | ON | OFF | OFF | OFF | ON |
| UNLOCKED LIMIT SWITCH | OFF | OFF | ON | OFF | OFF |

Fig. 3

ELECTRIC STEERING LOCK DEVICE AND METHOD THEREOF

CROSS-REFERENCE TO RELATED APPLICATIONS

This application claims priority under 35 U.S.C. § 119 to Japanese Patent Application No. 2004-292392. The entire disclosure of Japanese Patent Application No. 2004-292392 is hereby incorporated herein by reference.

BACKGROUND OF THE INVENTION

1. Field of the Invention

The present invention generally relates to an electric steering lock device and an electric steering lock method for locking steering by the fitting of a locking rod into a steering column.

2. Background Information

One example of an electric steering lock device is disclosed in Japanese Laid Open Patent Publication No. 2003-252174. In this publication, a steering lock control system is disclosed that uses a locking limit switch and an unlocking limit switch in the electric steering lock device for locking the steering by the fitting of a locking rod into a steering column. The locking limit switch turns on when the locking rod reaches a locking stop position, and the unlocking limit switch turns on when the locking rod reaches the unlocking stop position.

In view of the above, it will be apparent to those skilled in the art from this disclosure that there exists a need for an improved electric steering lock device. This invention addresses this need in the art as well as other needs, which will become apparent to those skilled in the art from this disclosure.

SUMMARY OF THE INVENTION

It has been discovered that in Japanese Laid Open Patent Publication No. 2003-252174, it is impossible to detect a failure whereby the locking limit switch remains off, or a failure whereby the unlocking limit switch remains off.

Therefore, one object of the present invention is to determine that either the locking limit switch or the unlocking limit switch has malfunctioned based on the state of a steering column lock being either locked or unlocked. Preferably, the present invention can determine either the locking limit switch or the unlocking limit switch has malfunctioned when both the locking limit switch and the unlocking limit switch are off in a state in which the locking rod is either locked or unlocked.

In order to achieve the object, the present invention provides an electric steering lock device that basically comprises a control unit, a locking limit switch, an unlocking limit switch, a state detection component, and a malfunction diagnostic component. The control unit is configured to output a drive command to operate a steering column lock between a steering locked state and a steering unlocked state. The locking limit switch is configured to turn on when the steering column lock reaches a locking stop position, and turn off after issuance of an unlocking command from the control unit to unlock the steering column lock. The unlocking limit switch is configured to turn on when the steering column lock reaches an unlocking stop position, and turn off after issuance of a locking command from the control unit to unlock the steering column lock. The state detection component is configured to detect a current state of the steering column lock as one of the steering locked state and the steering unlocked state. The malfunction diagnostic component is configured to determine a malfunction of one of the locking and unlocking limit switches when both the locking and unlocking limit switches are off and the current state of the steering column lock is detected to be in one of the steering locked state and the steering unlocked state.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2 is a table showing the on/off relationship of a locked-state switch and an unlocked-state switch relative to the positional relationship between the lever and groove of the locking rod in accordance with the present invention;

FIG. 3 is a table showing the relationship between the state of the locking rod relative to the on/off state of the locking and unlocking limit switches in accordance with the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
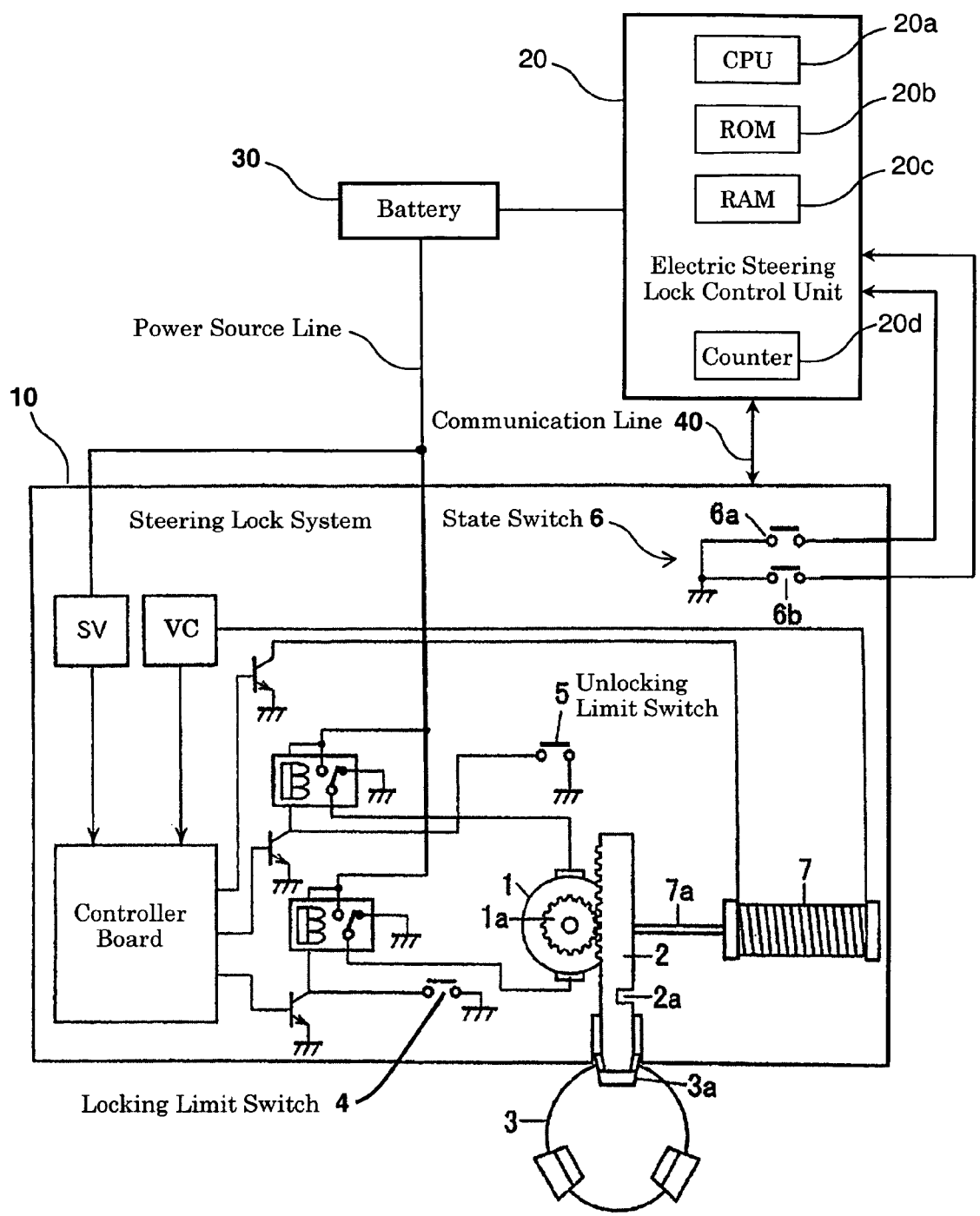
FIG. 1 is a schematic diagram showing a preferred structure of an electric steering lock device in accordance with a preferred embodiment of the present invention.

Referring initially to FIG. 1, an electric steering lock device is schematically illustrated in accordance with one embodiment of the present invention. The electric steering lock device in this embodiment is provided with a steering lock system 10, an electric steering lock control unit 20, and a battery 30. The steering lock system 10 is basically provided with a motor 1, a locking rod 2, a steering column 3, a locking limit switch 4, an unlocking limit switch 5, an ESCL state switch 6, and a solenoid 7. Basically, the motor 1, the locking rod 2 and the steering column 3 form a steering column lock.

The locking rod 2 is provided with a plurality of teeth which mesh with the output gear 1a of the motor 1 and can move back and forth. During operation of the steering lock, the locking rod 2 is moved in the direction of the steering column 3 by the rotation of the motor 1, and the distal end of the locking rod 2 engages with a groove 3a in the steering column 3. When the locking rod 2 is fitted into the steering column 3, the steering column 3 becomes incapable of rotating. By this configuration, the steering mechanism not shown in the diagram becomes unable to rotate (becomes locked). Conversely, when the motor 1 rotates in the opposite direction, and the locking rod 2 is withdrawn from the groove 3a of the steering column 3, the steering column 3 becomes able to rotate (is unlocked).

The ESCL state switch 6 is provided with a steering locked-state switch 6a and a steering unlocked-state switch 6b. The ESCL state switch 6 is configured and arranged to detect the locked/unlocked state of the steering based on the relationship between the locking rod 2 and a lever 7a of the solenoid 7. A groove 2a is provided to the locking rod 2, and is configured so that the lever 7a is inserted into the groove 2a of the locking rod 2 when the locking rod 2 is withdrawn from the steering column 3 (an unlocked state).

When the lever 7a is inserted into the groove 2a, the steering unlocked-state switch 6b is turned on, and the steering locked-state switch 6a is turned off. The lever 7a is inserted into the groove 2a, whereby the locking rod 2 in the unlocked state is prevented from being accidentally locked. When the lever 7a that had been inserted into the groove 2a is withdrawn by the locking command of the locking rod 2, the steering locked-state switch 6a is turned on, and the steering unlocked-state switch 6b is turned off. The on/off relationship of the steering locked-state switch 6a and steering unlocked-state switch 6b is summarized in FIG. 2.

The locking limit switch 4 is a switch for detecting the locking stop position of the locking rod 2. The locking limit switch 4 turns on when the locking rod 2 reaches the locking stop position. The unlocking limit switch 5 is a switch for detecting the unlocking stop position of the locking rod 2. The unlocking limit switch 5 turns on when the locking rod 2 reaches the unlocking stop position and the lever 7a is inserted into the groove 2a of the locking rod 2.

FIG. 3 is a diagram showing the relationship between the state of the locking rod 2 and the on/off state of the locking limit switch 4 and unlocking limit switch 5. In a locked state in which the locking rod 2 is fitted into the steering column 3, the locking limit switch 4 is turned on, and the unlocking limit switch 5 is turned off. In this arrangement, since the locking rod 2 that is in the locked state changes to the unlocked state when an unlocking command is outputted from the electric steering lock control unit 20 described hereinafter, the locking limit switch 4 changes from on to off. In this case, the unlocking limit switch 5 remains off during a transition period.

When the locking rod 2 is in an unlocked state in which the locking rod 2 is completely withdrawn from the groove 3a of the steering column 3, the unlocking limit switch 5 turns on and the lever 7a is inserted into the groove 2a of the locking rod 2. In this unlocked state, since the locking rod 2 changes to a locked state when a locking command is outputted from the electric steering lock control unit 20 described hereinafter, the unlocking limit switch 5 changes from on to off. In this case, the locking and unlocking limit switches 4 and 5 remain off during a transition period. The locking limit switch 4 changes from off to on when the locking rod 2 then is fitted into the steering column 3.

The electric steering lock control unit 20 preferably includes a microcomputer with a control program that determines if the locking and unlocking limit switches 4 and 5 are malfunctioning as discussed below. The electric steering lock control unit 20 preferably includes a CPU 20a, ROM 20b, RAM 20c, and a counter component 20d. The electric steering lock control unit 20 can also include other conventional components such as an input interface circuit, an output interface circuit, and other storage devices as needed and/or desired. It will be apparent to those skilled in the art from this disclosure that the precise structure and algorithms for the electric steering lock control unit 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The electric steering lock control unit 20 is connected to the steering lock system 10 via a communication line 40, and outputs a locking command and an unlocking command to the steering lock system 10. Since an electrical current whose direction corresponds to the command from the electric steering lock control unit 20 flows from the battery 30 to the motor 1 inside the steering lock system 10, the motor 1 rotates according to the direction of the electric current and drives the locking rod 2.

Figure 4:
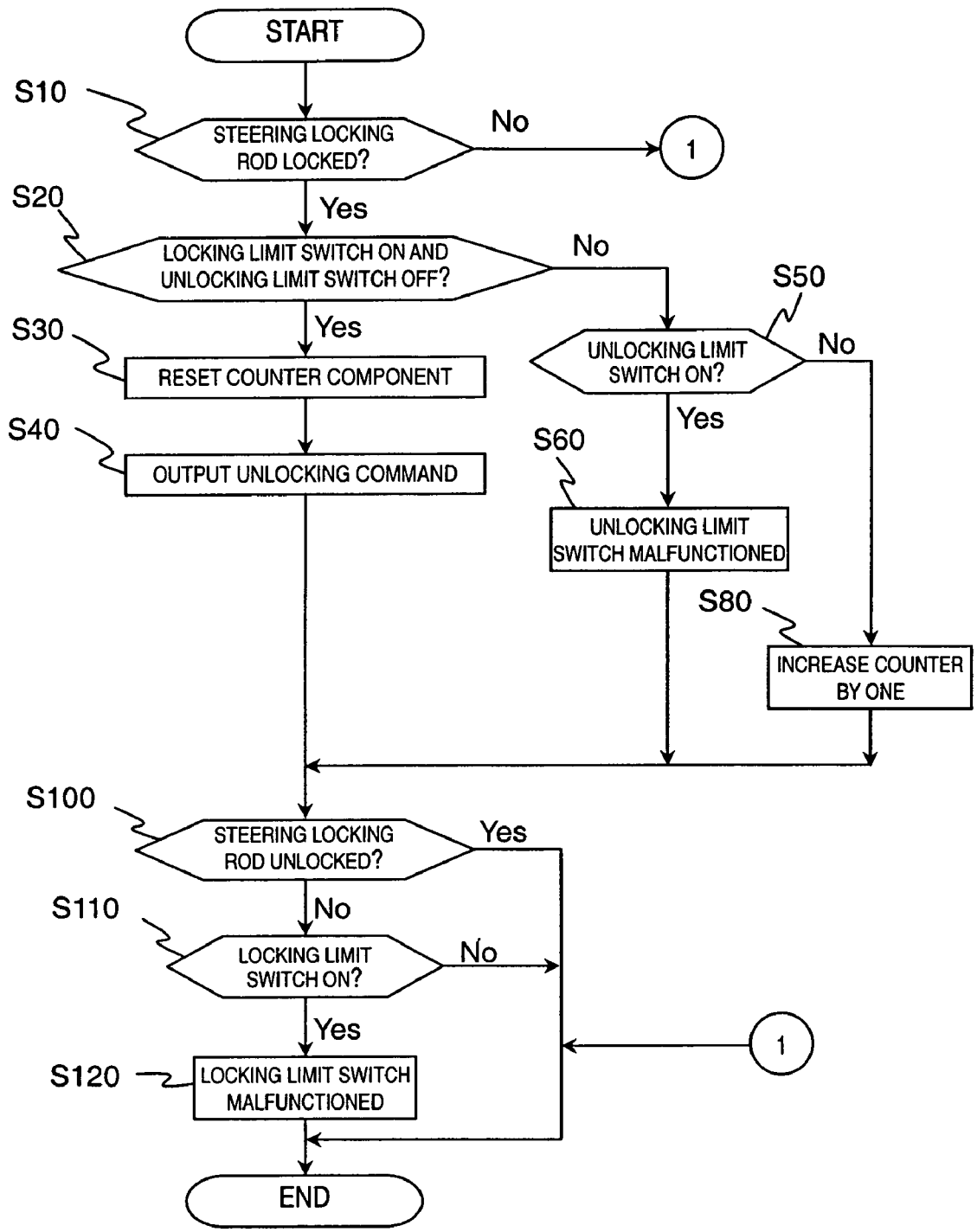
FIG. 4 is a flowchart showing a routine performed by the electric steering lock control unit when the locking rod is unlocked from a locked state in accordance with the present invention.

FIG. 4 is a flowchart showing the details of a routine performed by the electric steering lock control unit 20 when the locking rod 2 is unlocked from a locked state. In step S10, the electric steering lock control unit 20 is configured to determine based on the condition of the ESCL state switch 6 whether the locking rod 2 is locked (i.e., either in a steering locked state or a steering unlocked state). When the steering locked-state switch 6a is on and the steering unlocked-state switch 6b is off, the electric steering lock control unit 20 is configured to determine that the locking rod 2 is locked, and the routine proceeds to step S20. When the steering locked-state switch 6a is off and the steering unlocked-state switch 6b is on, the electric steering lock control unit 20 is configured to determine that the locking rod 2 is unlocked. Thus, the routine shown in the flowchart in FIG. 4 is ended.

In step S20, the electric steering lock control unit 20 is configured to determine whether the locking limit switch 4 is on and the unlocking limit switch 5 is off. When the electric steering lock control unit 20 determines that the locking limit switch 4 is on and the unlocking limit switch 5 is off, a malfunction is determined not to have occurred in the locking limit switch 4 and the unlocking limit switch 5, and the routine proceeds to step S30. Otherwise, the routine proceeds to step S50. Thus, during the first cycle of the flow chart of FIG. 4, the answer to step S50 should be YES when the limit switches 4 and 5 are correctly set for the initial locked position. However, after the first cycle through the flow chart of FIG. 4, the answer to step S50 should be NO, since, the locking and unlocking limit switches 4 and 5 should both be set to off due to the output of a locking command.

In step S30, the counter component 20d is reset, and the routine proceeds to step S40. In step S40, an unlocking command for unlocking the steering lock is outputted to the steering lock system 10. An electric current then flows from the battery 30 to the motor 1, the motor 1 drives the locking rod 2, and the locking rod 2 is withdrawn from the groove 3a in the steering column 3. When the locking rod 2 is withdrawn from the groove 3a in the steering column 3, the locking and unlocking limit switches 4 and 5 should both be set to off as seen in FIG. 3. After the unlocking command for unlocking the steering lock is outputted, the routine proceeds to step S100.

In step S50, the electric steering lock control unit 20 is configured to determine whether the unlocking limit switch 5 is on. When the electric steering lock control unit 20 determines that the unlocking limit switch 5 is on, the routine proceeds to step S60. If the unlocking limit switch 5 is on, then the unlocking limit switch 5 is probably malfunctioning, since the locking rod 2 should be in a state of transition state from locking to unlocking, i.e., the locking and unlocking limit switches 4 and 5 should both be off. Thus, in step S60, the electric steering lock control unit 20 is configured to determine that the unlocking limit switch 5 has malfunctioned, and the routine proceeds to step S100. The determination results indicating that the unlocking limit switch 5 has malfunctioned are stored in the RAM 20c.

When the electric steering lock control unit 20 determines in step S50 that the unlocking limit switch 5 is off, the routine proceeds to step S80. In step S80, the value of the counter component 20d is increased by one (counted up) in order to measure the number of times that the locking limit switch 4 and the unlocking limit switch 5 are both off, and the routine proceeds to step S100. The initial value of the counter component 20d is set to zero.

In step S100, the electric steering lock control unit 20 determines based on the condition of the ESCL state switch 6 whether the locking rod 2 is unlocked. When the steering locked-state switch 6a if off and the steering unlocked-state switch 6b is on, the locking rod 2 is determined to be unlocked, and the unlocking routine of the locking rod 2 is ended. When the electric steering lock control unit 20 determines that the locking rod 2 is not unlocked, the routine proceeds to step S110.

In step S110, the electric steering lock control unit 20 determines whether the locking limit switch 4 is on. When the electric steering lock control unit 20 determines that the locking limit switch 4 is on, the routine proceeds to step S120. If the locking limit switch 4 is on at this point, then the locking limit switch 4 is probably malfunctioning, because the locking rod 2 should be in a state of transition from locking to unlocking, i.e., the locking and unlocking limit switches 4 and 5 should both be off. Thus, in step S120, the locking limit switch 4 is determined to have malfunctioned, and the routine shown in the flowchart in FIG. 4 is ended. The routine shown in the flowchart in FIG. 4 is also ended when the electric steering lock control unit 20 determines in step S110 that the locking limit switch 4 is not on.

Figure 5:
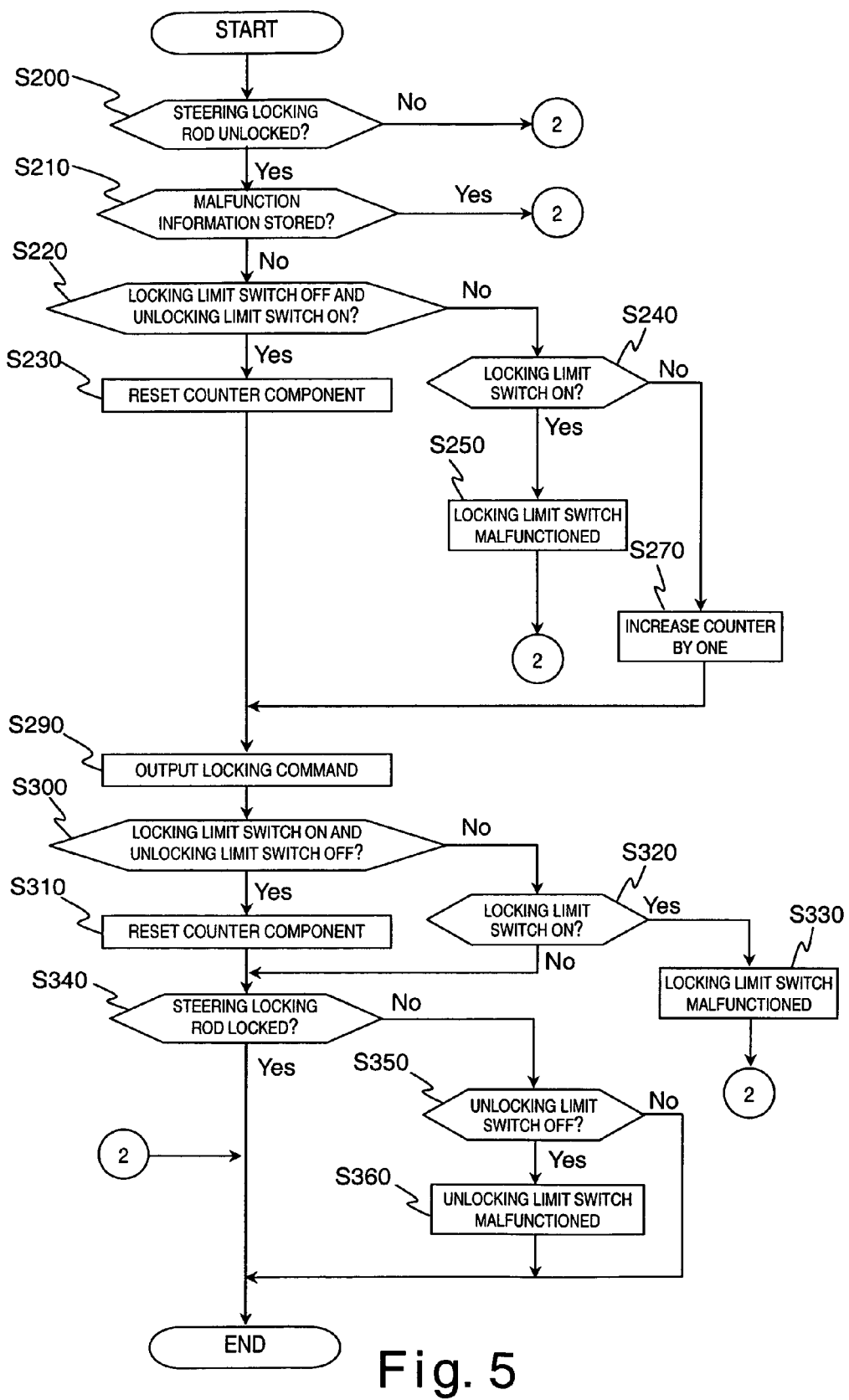
FIG. 5 is a flowchart showing a routine performed by the electric steering lock control unit when the locking rod is locked from an unlocked state in accordance with the present invention.

FIG. 5 is a flowchart showing the details of the routine performed by the electric steering lock control unit 20 when the locking rod 2 is locked from an unlocked state.

In step S200, the electric steering lock control unit 20 determines based on the condition of the ESCL state switch 6 whether the locking rod 2 is unlocked. When the steering locked-state switch 6a is off and the steering unlocked-state switch 6b is on, the electric steering lock control unit 20 determines that the locking rod 2 is unlocked, and the routine proceeds to step S210. When a different state exists, the electric steering lock control unit 20 determines that the locking rod 2 is not unlocked, and the routine shown in the flowchart in FIG. 5 is ended.

In step S210, the electric steering lock control unit 20 determines whether the malfunction information of the limit switches 4 and 5 is stored in the RAM 20c. This malfunction information is stored in the RAM 20c in steps S60, S90, and S120 of the flowchart in FIG. 4, steps S250, S280, S330, and S360 of the flowchart in FIG. 5, and step S420 of the flowchart in FIG. 6. The routine proceeds to step S220 when the electric steering lock control unit 20 determines that malfunction information for the limit switches 4 and 5 is not stored in the RAM 20c. When the electric steering lock control unit 20 determines that this malfunction information is stored in the RAM, the routine shown in the flowchart in FIG. 5 is ended. Specifically, when malfunction information is stored, the locking rod 2 is prevented from locking.

In step S220, the electric steering lock control unit 20 determines whether the locking limit switch 4 is off and the unlocking limit switch 5 is on. When the electric steering lock control unit 20 determines that the locking limit switch 4 is off and the unlocking limit switch 5 is on, a malfunction is determined to have occurred in the locking limit switch 4 and the unlocking limit switch 5, and the routine proceeds to step S230. Otherwise, the routine proceeds to step S240. In step S230, the counter component 20d is reset, and the routine proceeds to step S290.

In step S240, the electric steering lock control unit 20 determines whether the locking limit switch 4 is on. When the electric steering lock control unit 20 determines that the locking limit switch 4 is on, the routine proceeds to step S250. In step S250, the locking limit switch 4 is determined to have malfunctioned, and the routine shown in the flowchart in FIG. 5 is ended. The determination results indicating a malfunction in the locking limit switch 4 are stored in the RAM 20c.

If the electric steering lock control unit 20 determines in step S240 that the locking limit switch 4 is not on, then the routine proceeds to step S270.

In step S270, the value of the counter component 20d is increased by one (counted up) in order to measure the number of times that the locking limit switch 4 and the unlocking limit switch 5 are both off, and the routine proceeds to step S290.

In step S290, a command for locking the steering lock is outputted to the steering lock system 10. An electrical current then flows from the battery 30 to the motor 1, the motor 1 is started, and the locking rod 2 is driven towards fitting into the groove 3a of the steering column 3. When the locking rod 2 is driven towards the groove 3a in the steering column 3, the locking and unlocking limit switches 4 and 5 should both be set to off as seen in FIG. 3. When a command for locking the steering lock is outputted, the routine proceeds to step S300.

In step S300, the electric steering lock control unit 20 determines whether the locking limit switch 4 is on and the unlocking limit switch 5 is off. When the electric steering lock control unit 20 determines that the locking limit switch 4 is on and the unlocking limit switch 5 is off, the locking and unlocking limit switches 4 and 5 are determined to have not malfunctioned, and the routine proceeds to step S310. Otherwise, the routine proceeds to step S320. In step S310, the counter component 20d is reset, and the routine proceeds to step S340.

In step S320, the electric steering lock control unit 20 determines whether the locking limit switch 4 is on. The routine proceeds to step S330 when the locking limit switch 4 is determined to be on. If the locking limit switch 4 is on, then the locking limit switch 4 is probably malfunctioning, since the locking rod 2 should be in an unlocking state of, i.e., the locking limit switches 4 should be off. Thus, in step S330, the locking limit switch 4 is determined to have malfunctioned, the malfunction history is stored in the RAM 20c, and the routine shown in the flowchart in FIG. 5 is ended.

The routine proceeds to step S340 when the electric steering lock control unit 20 determines in step S320 that the locking limit switch 4 is not on, i.e., the locking limit switch 4 is off. In step S340, the electric steering lock control unit 20 determines based on the condition of the ESCL state switch 6 whether the locking rod 2 is locked. When the steering locked-state switch 6a is on and the steering unlocked-state switch 6b is off, the locking rod 2 is determined to have locked as per the command, and the routine shown in the flowchart in FIG. 5 is ended. The routine proceeds to step S350 when the opposite determination is made in step S340.

In step S350, the electric steering lock control unit 20 determines whether the unlocking limit switch 4 is off. The routine proceeds to step S360 when the unlocking limit switch 5 is determined to be off. In step S360, the locking limit switch 5 is determined to have malfunctioned, and the routine shown in the flowchart in FIG. 5 is ended. The determination results indicating that the unlocking limit switch 5 has malfunctioned are stored in the RAM 20c. The routine shown in the flowchart in FIG. 5 is also ended when the electric steering lock control unit 20 determines in step S350 that the unlocking limit switch 5 is not off.

Figure 6:
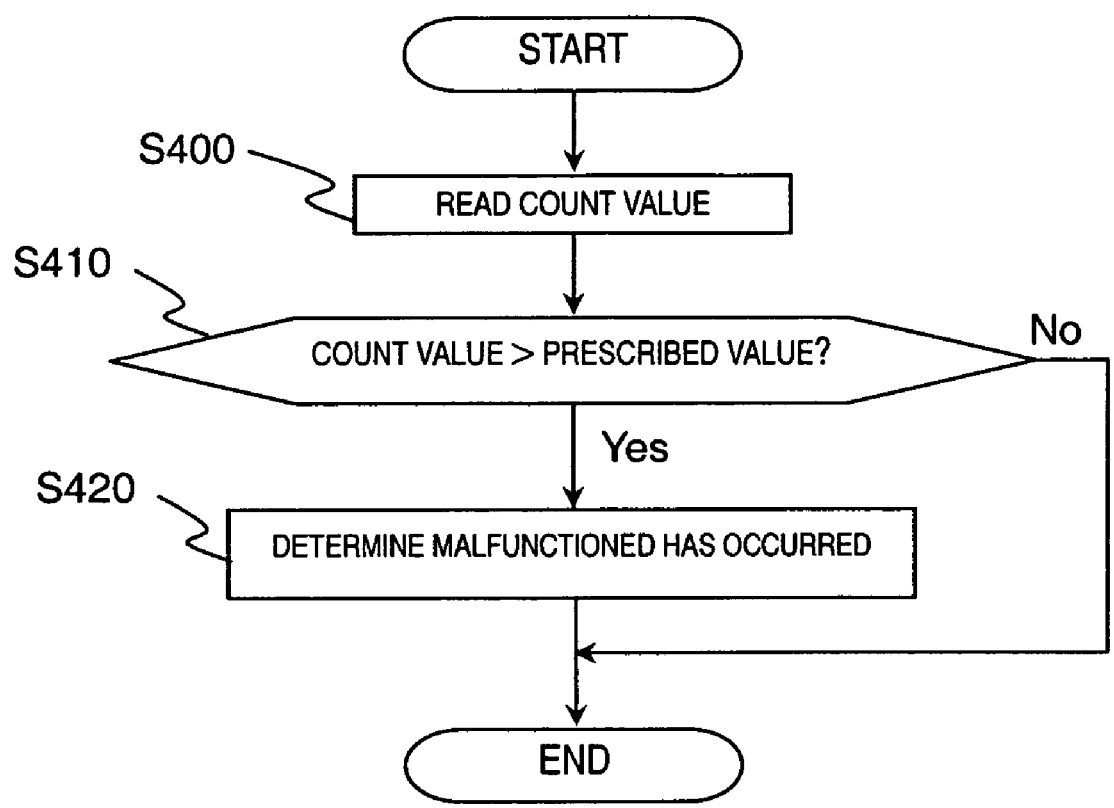
FIG. 6 is a flowchart showing a routine for diagnosing a malfunction of the locking limit switch and the unlocking limit switch based on a count value of the counter in accordance with the present invention.

FIG. 6 is a flowchart showing the details of the routine for diagnosing a malfunction in which the locking limit switch 4 or the unlocking limit switch 5 remains off, based on the count value of the counter component 20d. The routine beginning from step S400 is performed at a prescribed time intervals as set by the CPU 20a of the electric steering lock control unit 20.

The count value of the counter component 20d is read in step S400, and the routine proceeds to step S410. In step S410, the electric steering lock control unit 20 determines whether the count value of the counter component 20d read in step S400 is larger than a prescribed value (3, for example). The routine proceeds to step S420 when the electric steering lock control unit 20 determines that the count value of the counter component 20d is larger than the prescribed value, and when the count value is determined to be equal to or lower than the prescribed value, the routine shown in the flowchart in FIG. 6 is ended. In step S420, the electric steering lock control unit 20 determines that a malfunction has occurred whereby the locking limit switch 4 or the unlocking limit switch 5 remains off, and the malfunction history is stored in the RAM 20c. When the malfunction history is stored in the RAM 20c, the routine shown in the flowchart in FIG. 6 is ended.

By the electric steering lock device in the embodiment described above, the electric steering lock control unit 20 determines that either the locking limit switch 4 or the unlocking limit switch 5 has malfunctioned when both the locking limit switch 4 and the unlocking limit switch 5 are off in a state in which the locking rod 2 is either locked or unlocked. In particular, the electric steering lock control unit 20 determines that either of the limit switches 4 and 5 is malfunctioning when both the locking limit switch 4 and the unlocking limit switch 5 are off after the locked state of the steering lock is detected and before a command for unlocking the locking rod 2 is issued, and when both the locking limit switch 4 and the unlocking limit switch 5 are off after the unlocked state of the steering lock is detected and before a command for locking the locking rod 2 is issued. By this configuration, it is possible to detect a malfunction whereby either the locking limit switch 4 or the unlocking limit switch 5 is fixed in the off state.

By the electric steering lock device in this embodiment, the number of times that both the locking limit switch 4 and the unlocking limit switch 5 are off is measured in a state in which the locking rod 2 is either locked or unlocked, and the electric steering lock control unit 20 determines that either the locking limit switch 4 or the unlocking limit switch 5 has malfunctioned when the measured value exceeds a prescribed value. It is thereby possible to prevent a malfunction of the limit switches 4 and 5 from being detected by mistake based on a temporary fault in operation or the like.

The present invention is in no way limited by the embodiment described above. For example, the ESCL state switch 6 was provided with the steering locked-state switch 6a and the steering unlocked-state switch 6b in order to detect the locked/unlocked state of the steering, but the locked/unlocked state of the steering may also be detected by the on/off state of a single switch.

The relationship whereby the constituent elements described in the claims correspond to the constituent elements described in the embodiment is as follows. Specifically, the electric steering lock control unit 20 constitutes a control section or component with a malfunction diagnostic section or component. The locking limit switch 4 constitutes a locking limit switch section or component. The unlocking limit switch 5 constitutes a unlocking limit switch section or component. The ESCL state switch 6 constitutes the state detection section or component. These constituent elements may vary from the abovementioned components insofar as the characteristic functions of the present invention are not impaired.

As used herein to describe the above embodiment, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section, or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5 of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An electric steering lock device comprising:
   a control unit configured to output a drive command to operate a steering column lock between a steering locked state and a steering unlocked state;
   a locking limit switch configured to turn on when the steering column lock reaches a locking stop position, and turn off after issuance of an unlocking command from the control unit to unlock the steering column lock;
   an unlocking limit switch configured to turn on when the steering column lock reaches an unlocking stop position, and turn off after issuance of a locking command from the control unit to unlock the steering column lock;

a state detection component configured to detect a current state of the steering column lock as one of the steering locked state and the steering unlocked state; and a malfunction diagnostic component configured to determine a malfunction of one of the locking and unlocking limit switches when both the locking and unlocking limit switches are off and the current state of the steering column lock is detected to be in one of the steering locked state and the steering unlocked state.

2. The electric steering lock device according to claim 1, wherein the malfunction diagnostic component is configured to determine that one of the locking and unlocking limit switches has malfunctioned when both the locking and unlocking limit switches are off after the steering locked state is detected by the state detection component and before the steering unlocking command has issued since detecting the steering locked state.

3. The electric steering lock device according to claim 1, wherein the malfunction diagnostic component is configured to determine that one of the locking and unlocking limit switches has malfunctioned when both the locking and unlocking limit switches are off after the steering unlocked state is detected by the state detection component and before the steering unlocking command has issued since detecting the steering unlocked state.

4. The electric steering lock device according to claim 1, further comprising a counting component configured to measure a number of times that both of the locking and unlocking limit switches have been detected to be off in one of the steering locked and unlocked states, with the malfunction diagnostic component being configured to determine that one of the locking and unlocking limit switches has malfunctioned when the number of times measured by the counting component exceeds a prescribed value.

5. The electric steering lock device according to claim 4, wherein the counting component is configured to reset a counted number when one of the locking and unlocking limit switches turns on before the number of times that both of the locking and unlocking limit switches have been detected to be off reaches the prescribed value.

6. The electric steering lock device according to claim 1, wherein the malfunction diagnostic component is configured to diagnose a malfunction of the locking limit switch based on an on/off state of the locking limit switch and the current state detected by the state detection component.

7. The electric steering lock device according to claim 1, wherein the malfunction diagnostic component is configured to diagnose a malfunction of the unlocking limit switch based on an on/off state of the unlocking limit switch and the current state of the steering column lock detected by the state detection component.

8. The electric steering lock device according to claim 1, wherein the malfunction diagnostic component is configured to diagnose a malfunction of the locking limit switch based on an on/off state of the locking limit switch and the current state of the steering column lock detected by the state detection component.

9. The electric steering lock device according to claim 2, wherein the malfunction diagnostic component is configured to determine that one of the locking and unlocking limit switches has malfunctioned when both the locking and unlocking limit switches are off after the steering unlocked state is detected by the state detection component and before the steering unlocking command has issued since detecting the steering unlocked state.

10. The electric steering lock device according to claim 2, further comprising a counting component configured to measure a number of times that both of the locking and unlocking limit switches have been detected to be off in one of the steering locked and unlocked states, with the malfunction diagnostic component being configured to determine that one of the locking and unlocking limit switches has malfunctioned when the number of times measured by the counting component exceeds a prescribed value.

11. The electric steering lock device according to claim 10, wherein the counting component is configured to reset a counted number when one of the locking and unlocking limit switches turns on before the number of times that both of the locking and unlocking limit switches have been detected to be off reaches the prescribed value.

12. The electric steering lock device according to claim 2, wherein the malfunction diagnostic component is configured to diagnose a malfunction of the locking limit switch based on an on/off state of the locking limit switch and the current state detected by the state detection component.

13. The electric steering lock device according to claim 2, wherein the malfunction diagnostic component is configured to diagnose a malfunction of the unlocking limit switch based on an on/off state of the unlocking limit switch and the current state of the steering column lock detected by the state detection component.

14. The electric steering lock device according to claim 2, wherein the malfunction diagnostic component is configured to diagnose a malfunction of the locking limit switch based on an on/off state of the locking limit switch and the current state of the steering column lock detected by the state detection component.

15. The electric steering lock device according to claim 3, further comprising a counting component configured to measure a number of times that both of the locking and unlocking limit switches have been detected to be off in one of the steering locked and unlocked states, with the malfunction diagnostic component being configured to determine that one of the locking and unlocking limit switches has malfunctioned when the number of times measured by the counting component exceeds a prescribed value.

16. The electric steering lock device according to claim 15, wherein the counting component is configured to reset a counted number when one of the locking and unlocking limit switches turns on before the number of times that both of the locking and unlocking limit switches have been detected to be off reaches the prescribed value.

17. The electric steering lock device according to claim 3, wherein
the malfunction diagnostic component is configured to diagnose a malfunction of the unlocking limit switch based on an on/off state of the unlocking limit switch and the current state of the steering column lock detected by the state detection component.

18. The electric steering lock device according to claim 3, wherein
the malfunction diagnostic component is configured to diagnose a malfunction of the locking limit switch based on an on/off state of the locking limit switch and the current state of the steering column lock detected by the state detection component.

19. An electric steering lock device comprising:
control means for outputting a control command to operate a steering column lock;
locking limiting means for stopping a driving component when the steering column lock reaches a locking stop position;
unlocking limit switch means for stopping the driving component when the steering column lock reaches an unlocking stop position;
state detection means for detecting current state of the steering column lock as one of a steering locked state and a steering unlocked state; and
malfunction diagnostic means for diagnosing a malfunction of the locking limit switch based on the on/off state of the locking limit switch and the state of the steering lock detected by the state detection means; wherein
the malfunction diagnostic means determines that either the locking limit switch or the unlocking limit switch has malfunctioned when both the locking limit switch and the unlocking limit switch are off either in a state in which the steering column lock is locked or a state in which the steering column lock is unlocked.
malfunction diagnostic means for determining a malfunction of one of the locking and unlocking limit means when both the locking and unlocking limit means are off and the current state of the steering column lock is detected to be in one of the steering locked state and the steering unlocked state.

20. A steering lock malfunctioning method for an electric steering lock device provided with a locking limit switch that turns on when a steering column lock reaches a locking stop position, and turns off when an unlocking command for the steering column lock being outputted; and an unlocking limit switch that turns on when the steering column lock reaches an unlocking stop position, and turns off when a locking command for the steering column lock is outputted, wherein steering is locked by the fitting of a steering column lock into a steering column, the steering lock method comprising:
detecting an on/off status of the locking limit switch;
detecting an on/off status of the unlocking limit switch;
detecting a current state of the steering column lock as one of a steering locked state and an unlocked state; and
determining that one the locking and unlocking limit switches has malfunctioned when both the locking and unlocking limit switches are off and the current state of the steering column lock is detected to be in one of the steering locked state and the steering unlocked state.

* * * * *